(12) United States Patent
Vanleene

(10) Patent No.: US 12,006,094 B2
(45) Date of Patent: Jun. 11, 2024

(54) PACKAGING MODULES FOR PACKAGING OBLONG OBJECTS FOR TRANSPORT AND STORAGE PURPOSES AND METHOD APPLYING SUCH PACKAGING MODULES

(71) Applicant: PAVACON, GEWONE COMMANDITAIRE VENNOOTSCHAP, Westerlo (BE)

(72) Inventor: Paul Hendrik M Vanleene, Westerlo (BE)

(73) Assignee: PAVACON, GEWONE COMMANDITAIRE VENNOOTSCHAP, Westerlo (BE)

(*) Notice: Subject to any disclaimer, the term of this patent is extended or adjusted under 35 U.S.C. 154(b) by 75 days.

(21) Appl. No.: 17/625,463

(22) PCT Filed: Jun. 18, 2020

(86) PCT No.: PCT/IB2020/055693
§ 371 (c)(1),
(2) Date: Jan. 7, 2022

(87) PCT Pub. No.: WO2021/005431
PCT Pub. Date: Jan. 14, 2021

(65) Prior Publication Data
US 2022/0242612 A1    Aug. 4, 2022

(30) Foreign Application Priority Data
Jul. 10, 2019  (BE) .................................. 2019/5445

(51) Int. Cl.
B65D 61/00     (2006.01)
B65D 21/02     (2006.01)
(Continued)

(52) U.S. Cl.
CPC ......... *B65D 21/0204* (2013.01); *B65D 61/00* (2013.01); *B65D 85/20* (2013.01); *B65G 1/14* (2013.01); *B65G 2201/0217* (2013.01)

(58) Field of Classification Search
CPC .. B65D 21/0201–0208; B65D 21/0204; B65D 2519/00097; B65D 2519/00761;
(Continued)

(56) References Cited

U.S. PATENT DOCUMENTS 3,945,497 A     3/1976  Greenberg

FOREIGN PATENT DOCUMENTS

FR     2738219 A1     3/1997
WO     2011048427 A2  4/2011

OTHER PUBLICATIONS

International Search Report dated Sep. 11, 2020; International Application PCT/IB2020/055693.

*Primary Examiner* — Mollie Impink
(74) *Attorney, Agent, or Firm* — Dinsmore & Shohl LLP

(57) ABSTRACT

Stackable packaging modules for packaging oblong objects with a U-shaped profile made from synthetic material, formed by a horizontal bottom profile and two upright legs which can be fixed, or collapsible whereby the horizontal bottom profile along both upright long sides is provided with at least two protrusions and at least two hollow recesses in which the at least two protrusions and at least two recesses of a horizontal bottom profile of an adjoining module fit. The horizontal bottom profile is provided on the underside over the whole length with a slit-shaped recess in which a fork of a forklift truck, reach truck or side loader fits.

18 Claims, 8 Drawing Sheets

(51) Int. Cl.
*B65D 85/20* (2006.01)
*B65G 1/14* (2006.01)

(58) Field of Classification Search
CPC ........... B65D 2519/00746; B65D 2519/00686; B65G 1/14; B65G 2201/0217
See application file for complete search history.

PACKAGING MODULES FOR PACKAGING OBLONG OBJECTS FOR TRANSPORT AND STORAGE PURPOSES AND METHOD APPLYING SUCH PACKAGING MODULES

The present invention relates to packaging modules for packaging oblong objects for transport and storage purposes and a method applying such packaging modules.

In particular, the invention is intended for packaging, transporting and stacking oblong products such as rods, tubes and open profiles using reusable modules from synthetic material or from a material that is sufficiently strong and lightweight to be handled manually and can be stored outside without rusting.

It is known that such oblong products are currently typically packaged by fastening stacks of said products with heavy steel strapping, such that the underlying bundle is resistant to the pressure of the overlying bundles.

Traditionally, lost packaging such as wooden planks, slats or beams are also often used which are typically used only once and cause a never ending waste flow when unpacking the transported goods. Moreover, the presence of dry wood also causes a fire hazard and the wood is unsuitable for storage in open air, where the wood can get wet and cause oxidation of the packaged objects.

Typically, such traditionally packaged goods are moved by means of a forklift truck, side loader or reach truck, whereby the forks of the transport vehicle often reach to beyond the packaged goods and thus regularly cause damage to other packaged goods for example. The lack of standardisation of such traditionally packaged bundles and packaging materials means that the packaged goods can often shift during transport, handling or storage, again resulting in damage to the packaged goods or to the surroundings.

The purpose of the present invention is to provide a solution to the aforementioned and other disadvantages, by providing standardised packaging modules which can be ergonomically and manually handled and moreover are reusable and also 100% recyclable.

To this end, the invention relates to stackable packaging modules for packaging oblong objects, whereby the modules at least consist of a U-shaped profile made from a synthetic material or a material that is sufficiently strong and light weight, formed by a horizontal bottom profile and two upright legs, whereby the horizontal bottom profile always has the same standard length and the two upright legs can have several heights, both however always being equally high and whereby the horizontal bottom profile is provided along both upright long sides with at least two protrusions and at least two hollow recesses in which the at least two protrusions and at least two recesses of a horizontal bottom profile of an adjoining module fit and whereby the horizontal bottom profile is provided on the underside over the whole length with a slit-shaped recess or shaft in which a fork of a forklift truck, reach truck or side loader fits and whereby the upright legs on their upperside are provided with convex studs which fit into concave cavities provided to this end on the underside of the horizontal bottom profile of an overlying module stacked on the bottom one.

A first advantage of such stackable packaging modules is the increased safety when stacking and transporting the bundles of oblong objects.

Bundles of loads that are not completely flat at the top due to an incomplete row no longer pose a safety problem because the top is delimited on either side by the upright legs of the supporting packaging modules.

It also avoids the use of stowage aids made from inflammable materials such as wood, thus preventing not only fire and a risk of fire but also the creation of non-recoverable waste flows.

Another advantage is that the forks of the transport machines no longer come into contact with the load but only with the bottom packaging modules, such that the forks cannot damage the load.

An added advantage of the stackable modules is that they prevent suprajacent bundles from overloading the underlying bundles, which eliminates the need to fasten the bundles using strong steel straps. A much lighter fastening such as lashing straps or windings made from a light but strong material such as polyester can suffice to securely fasten every bundle to the stackable module on which the bundle is lying.

Another advantage of the stackable packaging modules is that they can be stacked to a higher safe height, because the modules support each other, which results in a smaller floor space for a given amount of stacked load.

Preferably, the lateral protrusions are mushroom-shaped protrusions or protrusions provided with an edge enabling the protrusion to interlock with an adjoining module.

Said protrusions allow several empty carrier modules to interlock with each other, such that they can be moved together by the forks of a forklift truck or another transport device without requiring a load-bearing pallet to this end.

Preferably the stackable packaging modules are made from a synthetic material or a material that is reusable and 100% recyclable. The packaging modules made from a synthetic material or other non-oxidisable material offer the advantage that they can also be stored in open air and are not subject to water damage.

Preferably, the standard length of the horizontal bottom profile is 1.20 m for all stackable packaging modules.

An advantage of said standard length is that it is wide enough to serve as a solid base for higher stacks without the risk of the load shifting or the stack falling over.

Another advantage of said standard length is that it ensures that the forks of a transport device such as a forklift truck do indeed support the complete bottom module, but do not protrude to beyond said module, such that damage to other nearby goods is avoided.

A major advantage of the standard length is that it opens the door to automation of the packaging, whereby the modules are always placed at the same distance from each other when packaging the oblong objects.

The height of the upright legs of the packaging modules is always the same in relation to each other but can vary in height depending on the number of heights one wants to produce.

An advantage of such different height levels is that they allow for a more accurate definition of the desired height of a stack and a maximum capacity utilisation of a lorry or a warehouse, without exceeding the maximum permitted weight.

The protrusions along both upright long sides of the horizontal bottom profile allow empty adjoining packaging modules to interlock with each other such that they, without a load-bearing pallet, can be handled, transported, or stacked.

The interlocking operation is provided by a mushroom-shaped end or another interlocking edge of the protrusions, which ensure that when the support under the bottom surface of a packaging module is removed, it still remains suspended between two adjacent modules when the protrusions make a connection with it.

The protrusions along both upright long sides of filled packaging modules protrude freely because the protrusions are also used to fasten the bundles of packaged objects to their load-bearing packaging module by fastening the bundles with straps made from synthetic material or lashing straps which are wrapped around the protrusions with an edge along both sides of the modules, with the purpose of retaining the relative position of the packaging module and the borne load bundle during the handing, transporting or stacking of the loaded packaging modules.

Preferably, the fixed centre distance between the vertical virtual middle sections across the load-bearing packaging modules is equal to 80 cm or 90 cm or a multiple thereof, with the purpose of being able to lift and move two or more packaging modules with their load by means of the forks of a forklift truck, reach truck or side loader.

The convex studs provided on the upperside of the upright legs of the stackable modules and which fit in the concave cavities provided to this end on the underside of an overlying module, automatically correct small position differences when stacking the modules and further prevent that the stacked packaging modules shift relative to each other during their handling, transport or storage.

Empty packaging modules can be slid against each other, such that the protrusions of the adjoining bottom profiles slide into the hollow recesses provided to this end of the first packaging module until a series of four or five or a multiple of four or five modules are against each other, after which the at least four or five modules can be lifted by two forks of a forklift truck or another transport device, whereby the modules not supported by a fork still remain fastened to each other by the interlocking operation of the protrusions and the at least four or five modules can be lifted self-supportingly without the need for a load-bearing pallet.

Said characteristic is important to easily recover the packaging modules after use or have them returned to their origin for reuse. Said recovery or return can be realised without additional repackaging materials and can be taken back via the same logistical flow as the delivery of the original load or by a pooling company specialised in this.

Obviously the load with the modules can also be moved by other means than by the forks of a forklift truck, such as traditional belts, girths or electric lifting magnets if the load allows it.

In a preferred variant of the packaging module according to the invention, the packaging module is provided with two collapsible upright legs, which can be manually raised or collapsed toward a vertical or horizontal position by rotating the leg and locking it in a vertical or a horizontal position.

Preferably the leg in question is raised or collapsed by sliding guide pins fixed to the upright leg into designated slots of a terminal shoe at each end of the horizontal bottom profile, to which the leg in question is or can be hingedly fastened.

A big advantage connected to said collapsible legs is that after use in raised position of the legs for the transport of a heavy load, the empty packaging modules can be transported in collapsed position of the legs, and use up a much smaller volume in the return transport for recovering the packaging modules.

In this variant the horizontal bottom profile is preferably 1.20 m long, and the upright legs are of equal length, whereby said length can be 1.05 m or 0.65 m, said legs overlapping each other in collapsed position, or said length can be 0.45 m or 0.25 m, whereby the collapsed legs do not overlap in collapsed position.

In collapsed position, the empty packaging modules can be stacked on each other in stacks, after which up to five stacks are interlockingly slid against each other, and jointly lifted by one forklift truck without a supporting transport pallet.

It is handy hereby that the modules are perfectly symmetrical and do not have a front or back, such that the stacks of empty modules can be interlocked along both sides with an adjoining stack of empty modules.

All this means that the modules not only allow the packaging costs for said oblong objects to be lowered, but also for polluting packaging materials to be avoided, the safety to be increased and bringing both the automation of the packaging process itself, including the stacking of long products in the packaging modules and fastening the bundles to the modules with straps, and the automation of handling and transporting the bundles within reach. The standardisation inherent to said new method makes it simpler. Moreover, said modules allow transport and handling damage to be avoided.

With the intention of better showing the characteristics of the invention, a few preferred embodiments of stackable packaging modules according to the invention are described hereinafter by way of an example, without any limiting nature, with reference to the accompanying drawings, wherein:

FIG. 1 schematically shows a side view of a packaging module according to the invention;

Figure 1:
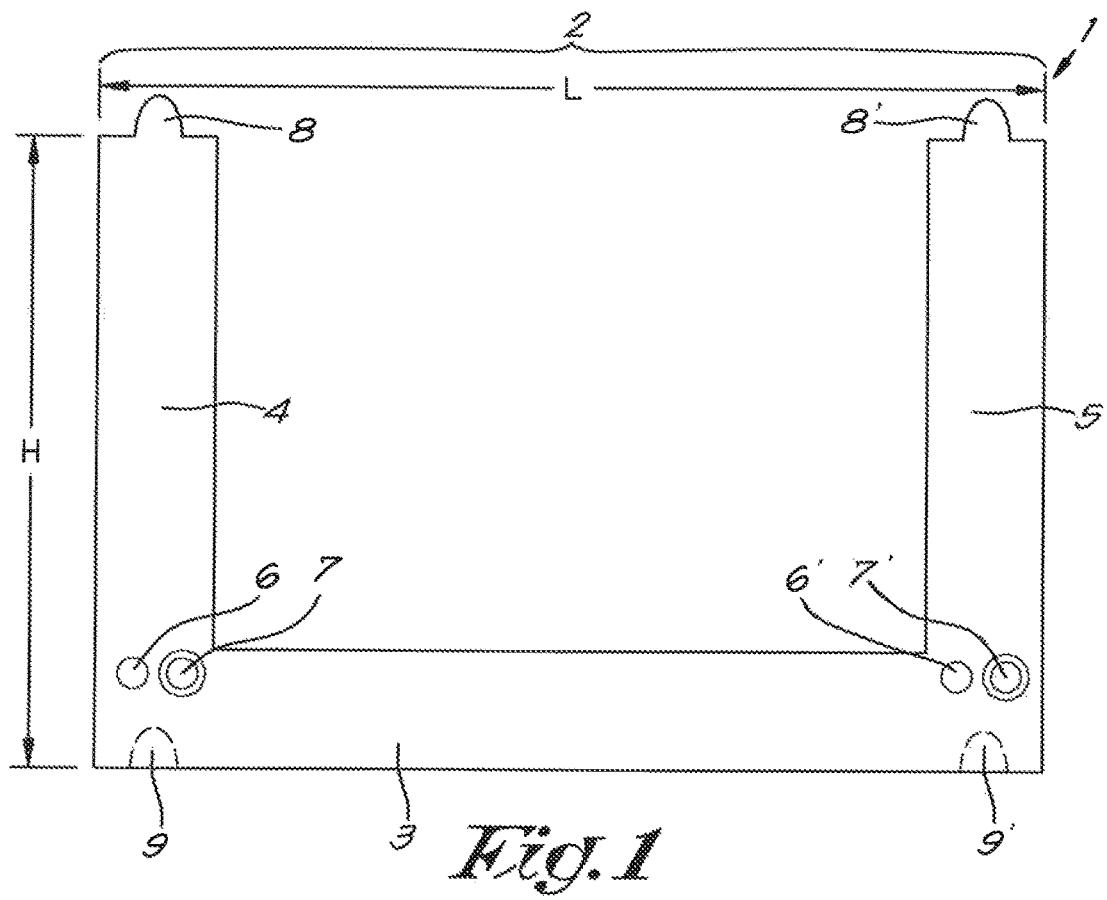

FIG. 1 shows a side view of a packaging module 1 according to the invention, consisting of a U-shaped profile 2 made from synthetic material or another material which is sufficiently strong and light, formed by a horizontal bottom profile 3 and two upright legs 4, 5, whereby the horizontal bottom profile 3 always has the same standard length L and the two upright legs in this case both have a higher height H and whereby the horizontal bottom profile 3 is provided along both upright long sides with protrusions 6, 6' and hollow recesses 7, 7' in which the protrusions of a horizontal bottom profile of an adjoining module fit and whereby the upright legs 4, 5 on their upperside are provided with convex studs 8, 8' provided to this end which fit into concave cavities 9, 9' on the underside of the horizontal bottom profile 2 of an overlying module.

Figure 2:
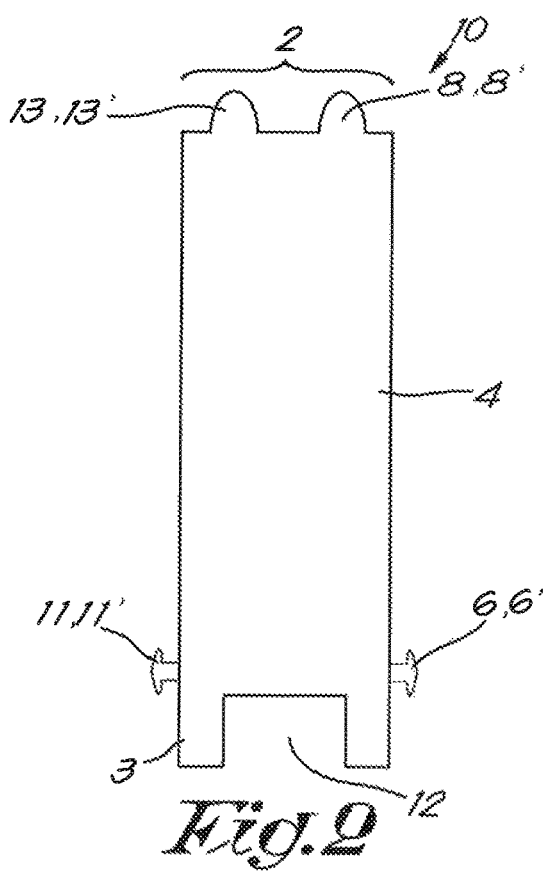
FIG. 2 shows a front view of FIG. 1.

FIG. 2 shows a front view 10 of the packaging module 1 of FIG. 1, whereby one upright leg 4 of the U-shaped profile 2 is shown with two, in this case mushroom-shaped protrusions 6, 6' and 11, 11', along both sides and whereby the horizontal bottom profile 3 is provided on the underside over the whole length with a slit-shaped recess 12 or shaft in which a fork of a forklift truck fits and whereby the upright legs 4, 5 on their upperside are provided with one or two convex studs 8, 8' and 13, 13' which fit in concave cavities 9, 9' provided to this end on the underside of the horizontal bottom profile of an overlying module.

Figure 3:
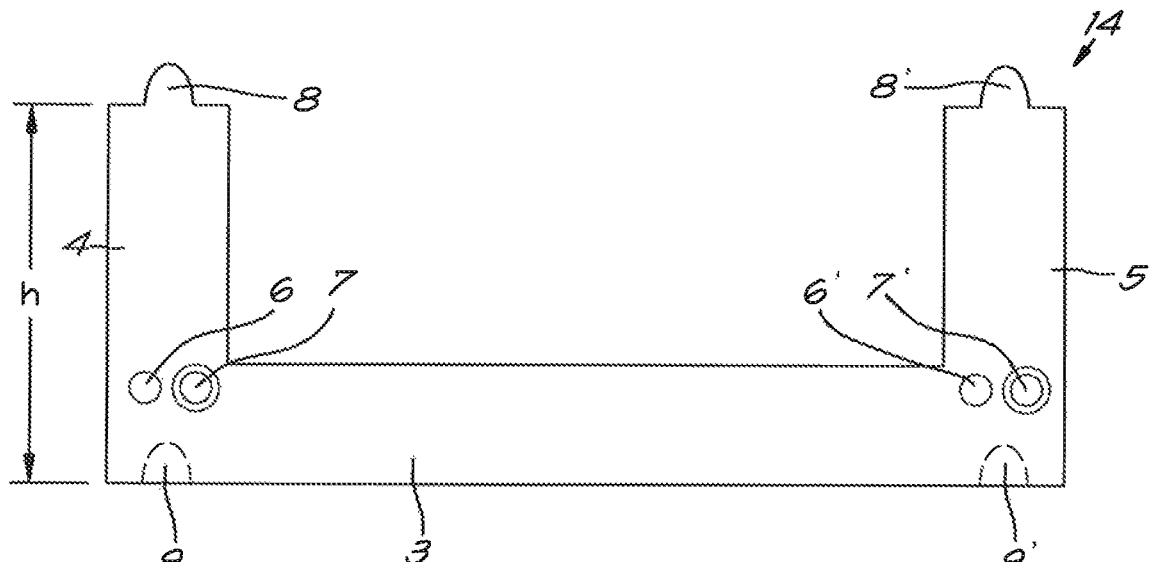
FIG. 3 shows a side view of a lower variant of FIG. 1.

FIG. 3 shows a variant 14 of FIG. 1, whereby in this case the upright legs 4, 5 have a lower height h, but the horizontal bottom profile 3 always has the same standard length L.

Figure 4:
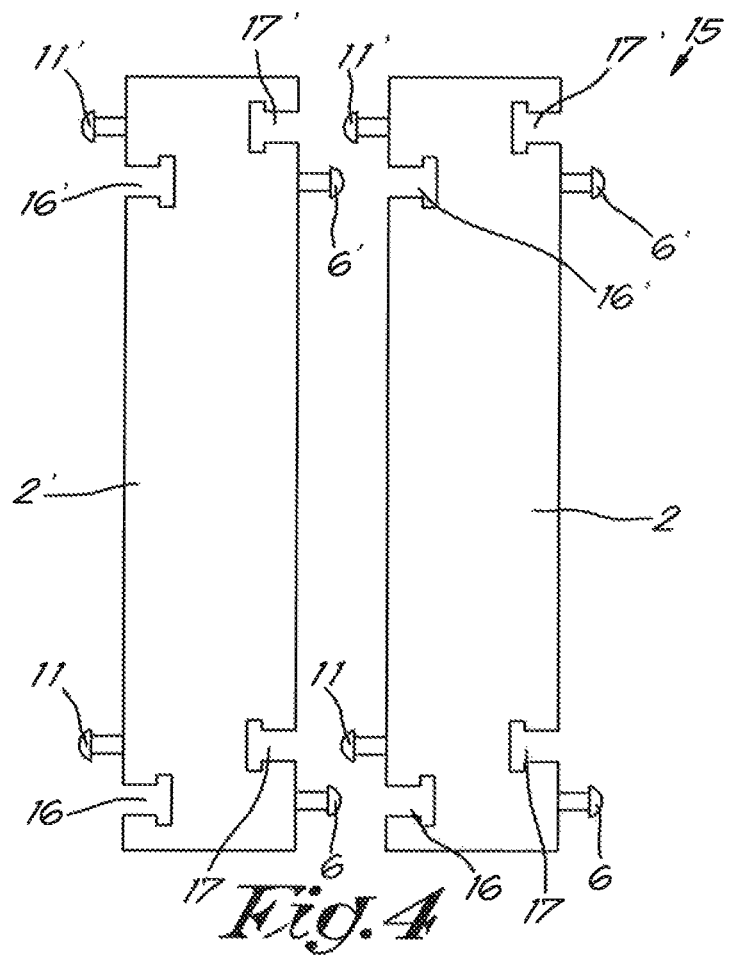
FIG. 4 shows a top view of two packaging modules according to FIG. 1.

FIG. 4 shows a top view 15 of two packaging modules 1, 1', whereby in this case the mushroom-shaped protrusions (6, 6', 11, 11') of one module fit in the recesses provided to this end (16, 16', 17, 17') in the second module and vice versa. The two modules are identical and always fit in each other, regardless of the side that is turned to the adjoining module.

Figure 5:
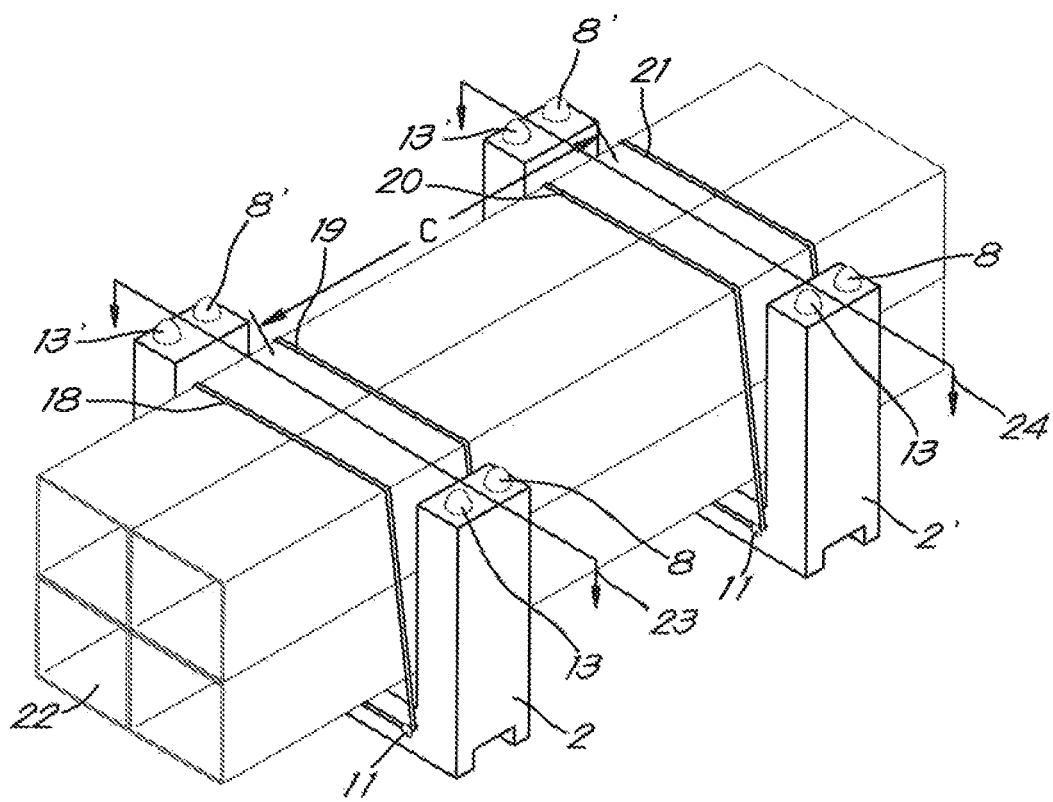
FIG. 5 shows a bird's-eye view of two packaging modules according to the invention, but now loaded with a bundle of long objects.

FIG. 5 shows a load of oblong objects, packaged in one pair of packaging modules 2, 2' according to the invention, whereby in this case two modules with a height H are used to support the packaged load. The load is fastened by means of four straps (18, 19, 20, 21) and fastened to the mushroom-shaped protrusions (6, 6', 11, 11') along both sides of each packaging module (2, 2') to securely fasten the load, in this case a bundle 22 of oblong objects, to the packaging modules.

The two modules are located at a fixed centre distance C between the vertical virtual middle sections 23, 24, of the load-bearing packaging modules, said centre distance being equal to 80 cm or 90 cm, with the purpose of being able to lift and move both packaging modules 2, 2' with their load by means of two forks of a forklift truck.

Figure 6:
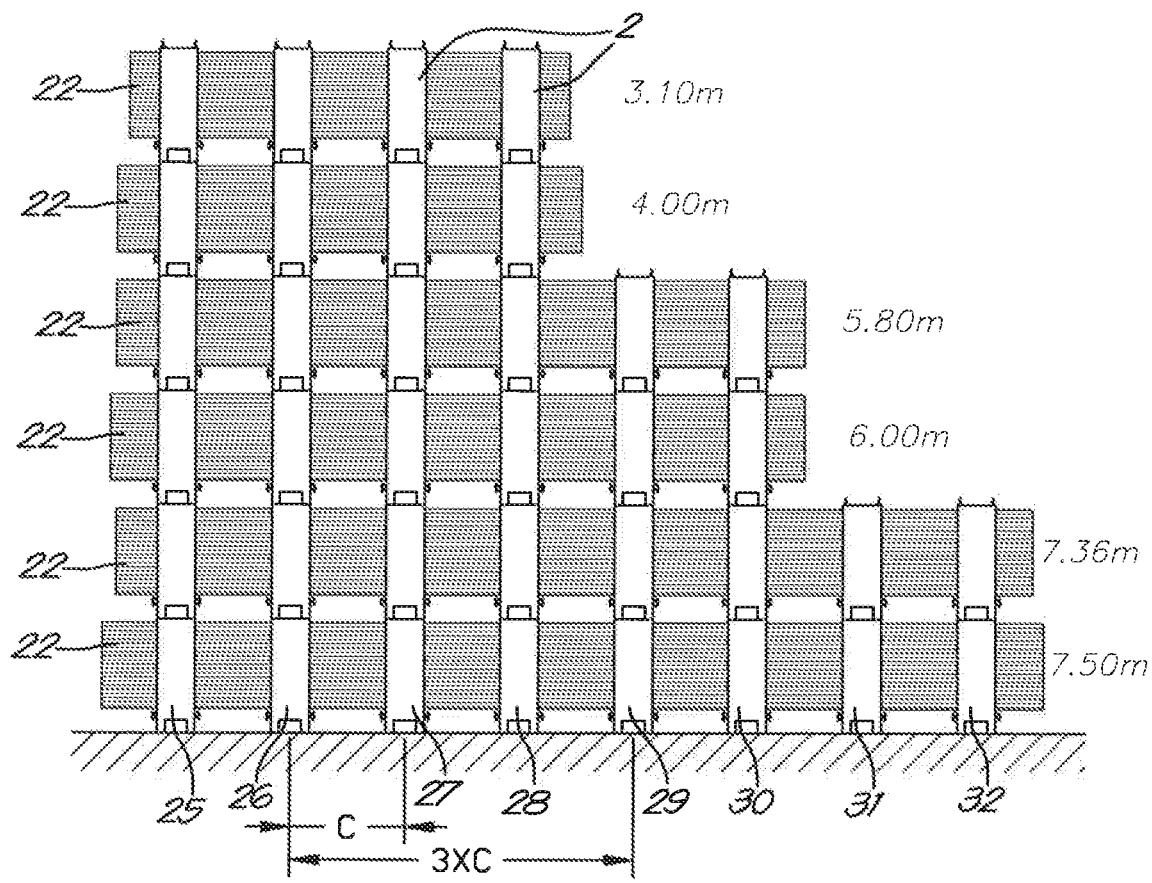
FIG. 6 shows a front view of a stack of loaded bundles, loaded on several packaging modules.

FIG. 6 shows a side view of a stack of several bundles 22 of oblong objects, in this case bundles of tubes, whereby each bundle has a different length, but every bundle is supported by symmetrically placed packaging modules 2 and all packaging modules are at the same centre distance C from each other. The two longest bundles are supported at the bottom by 8 towers 25-32 of two modules, the two medium-long bundles are stacked on them and are supported by six modules in the towers 25-30, whereas the two shortest bundles were stacked at the top, supported by four packaging modules on the towers 25-28.

Figure 7:
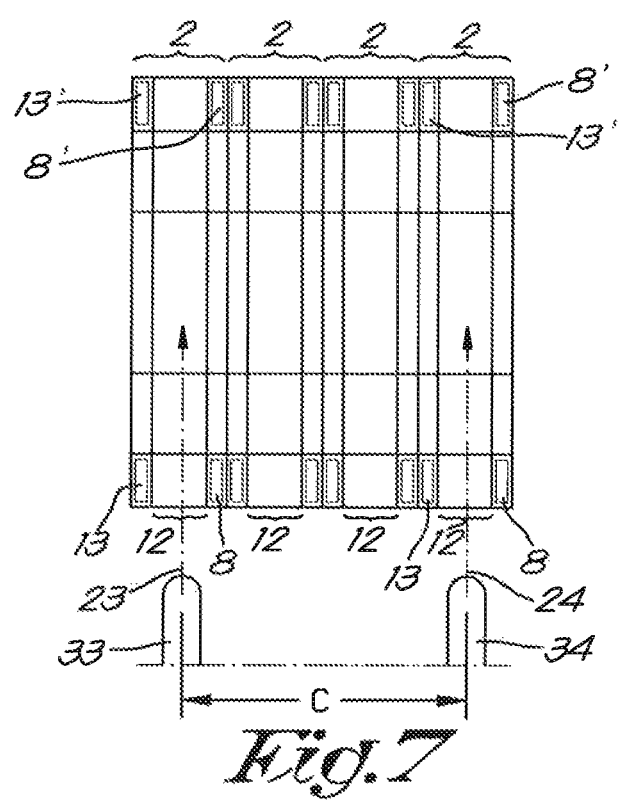
FIG. 7 shows a top view of four empty packaging modules against each other, ready for forklift truck transport.

FIG. 7 shows a top view of four empty packaging modules 2 that are slid against each other, such that the lateral protrusions 11, 11', 6, 6' are slid in the cavities 16, 16', 17, 17' provided to this end in the adjoining modules (not shown on this figure). The convex studs 13, 8, 13', 8' on the upperside of the upright legs 4, 5 of each module 2 are shown as oblong shapes on the figure. The slots 12 at the bottom of every module 2, in which a fork of a forklift truck fits, are also visible on the figure. The two most outer modules of the four modules are located at the fixed centre distance C between their vertical virtual middle sections 23, 24 and therefore 80 cm from each other, with the purpose of lifting and moving the whole set of four empty packaging modules 1 together with the empty packaging modules 2 on top by means of two forks 33, 34 of a forklift truck.

Figure 8:
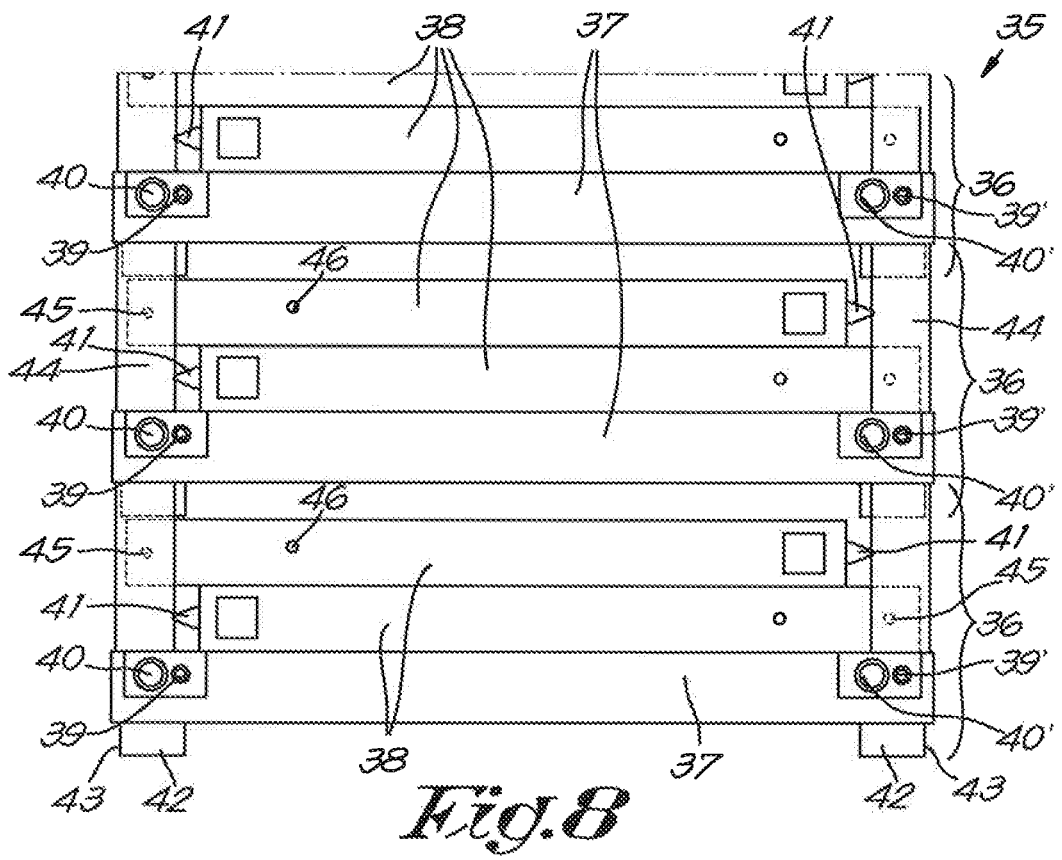
FIGS. 8 to 10 show a side view of a stack of empty collapsed packaging modules for three different lengths of collapsed legs.

FIG. 8 shows a side view of a stack 35 of empty collapsed packaging modules 36, the bottom profile 37 of which has a length of 1.20 m and the collapsed legs 38 a length of 1.05 m and whereby the horizontal bottom profile 37 at both ends is provided with protrusions 39, 39' and hollow recesses 40, 40' in which the protrusions of a horizontal bottom profile 37 of an adjoining stack packaging modules can fit and whereby the collapsed legs 38 are provided on their upperside with pointed studs 41, which fit in cavities 42 provided to this end on the underside of two feet 43 at the ends of the horizontal bottom profile 37 of a suprajacent packaging module, when the legs 38 are raised in a vertical position. The two collapsed legs 38 overlap each other and touch each other over almost their entire length.

Each horizontal bottom profile 37 is also provided at both ends with a shoe 44, which is provided with slots in which the two guide pins 45, 46 of a collapsible leg can be guided to raise or collapse them, and said shoe 44, in collapsed position of the legs, offers space to the foot of a suprajacent bottom profile 37 of a collapsed packaging module stacked above, to keep said load in the desired location.

Figure 9:
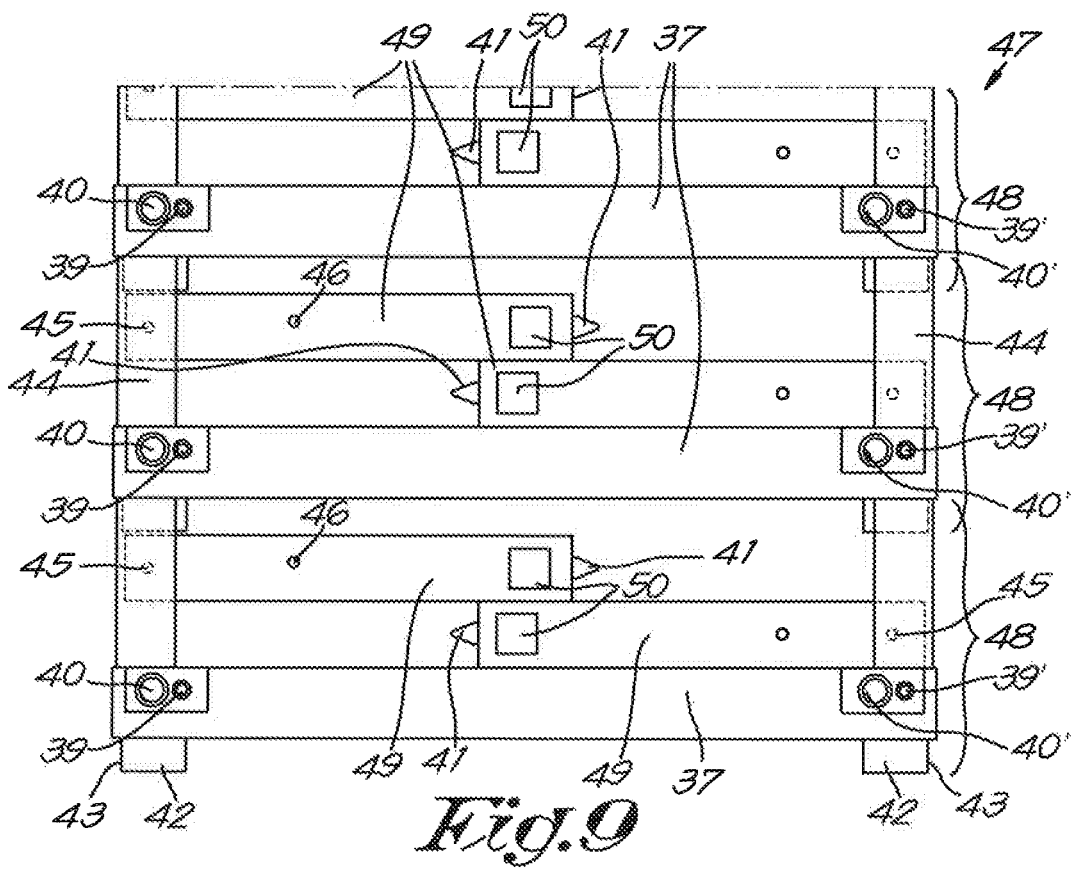

FIG. 9 shows a side view of a stack 47 of empty collapsed packaging modules 48, as shown in FIG. 8, but now with shorter collapsed legs 49 with a length of 0.65 m which overlap and touch over a shorter distance, on the level of square lifting holes 50 in the collapsed legs 46 on the upperside of the collapsed legs 49.

Figure 10:
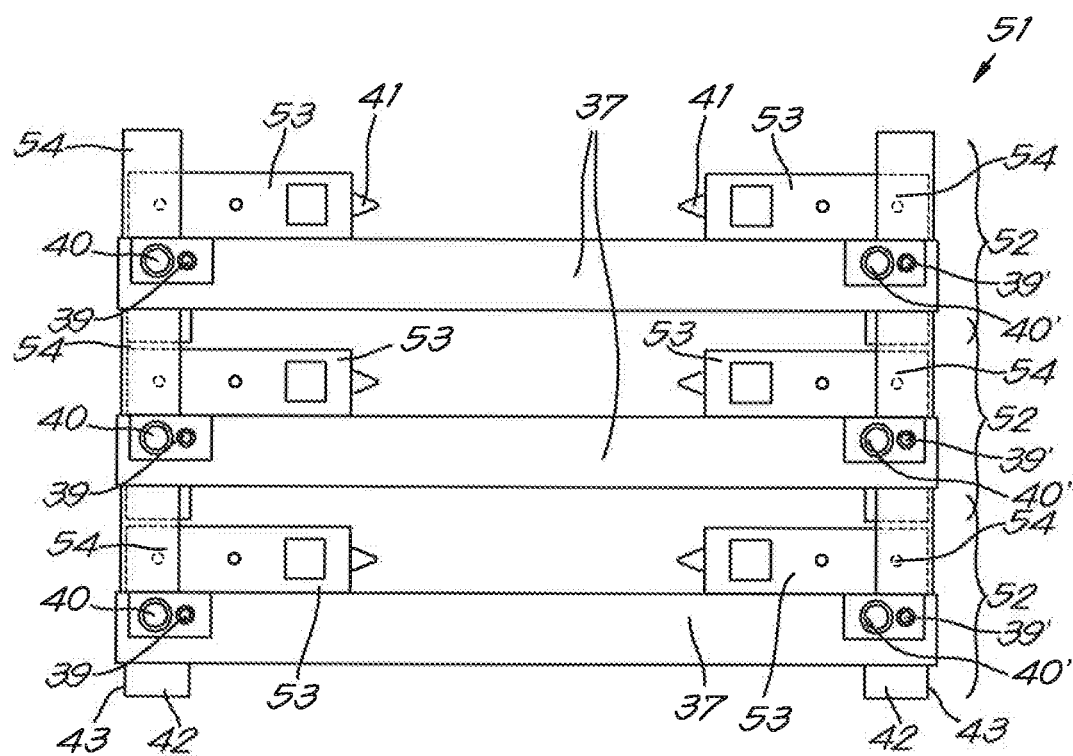

FIG. 10 shows a side view of a stack 51 of empty collapsed packaging modules 52, but now with even shorter collapsed legs 53 with a length of 0.45 m or 0.25 m which no longer overlap or touch, such that the height of the shoes 54 at every empty collapsed packaging module 52 can be lower, and the stack 51 of empty packaging modules takes up even less space for the return transport.

Each horizontal bottom profile 37 is provided with two terminal shoes 54 at the ends of the horizontal bottom profile, whereby each leg 53 can be manually raised or collapsed in a vertical or horizontal position by rotating the leg and locking it in the vertical or the horizontal position by moving the guide pins 45,46 fixed to the rotating leg in slots of the shoe 54 provided to this end to which the leg is hingedly fastened.

Figure 11:
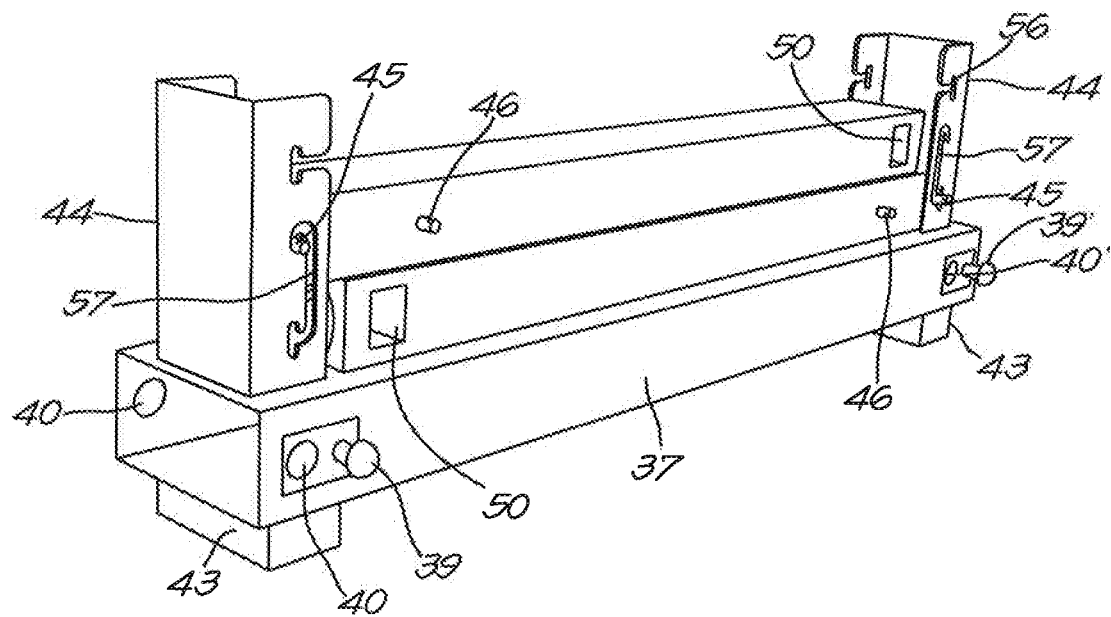
FIG. 11 shows a perspective view of one longtainer packaging module in collapsed condition.

FIG. 11 shows a packaging module 55 according to the invention in collapsed condition, said module being suitable for packaging very long objects and also called longtainer, and having the longest legs of 1.05 m. On said figure the terminal feet 43 and shoes 44 on the horizontal bottom profile 37 are more visible as well as the guide pins 45, 46 on every collapsed leg 38, which by rotating the collapsed legs can be moved through the slots 56, 57 provided to this end to hingedly bring the collapsed legs 38 to a vertical raised position, and locking them in the raised position. The square lifting holes 50 in the upright legs 38 of the packaging module 55 can be used to lift the module using a crane for example.

Figure 12:
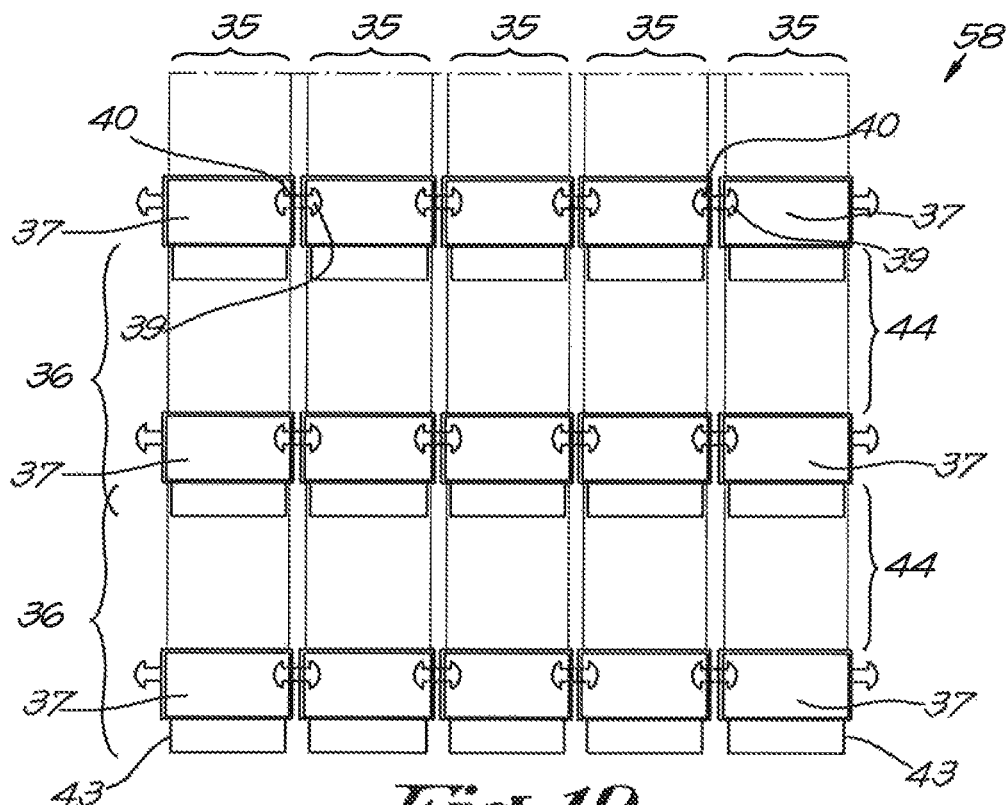
FIGS. 12 and 13 show a front view of five stacks of empty packaging modules for overlapping and for non-overlapping lengths of collapsed legs slid against each and interlocked.

FIG. 12 shows a front view of a group 58 of five stacks 35 of empty and collapsed modules 36 slid against each other and thus interlocked because of the lateral protrusions 39, 39' in the horizontal bottom profiles 37 of a stack, which fit in recesses 40, 40' provided to this end in the horizontal bottom profiles 37 of an adjoining stack 35 of empty modules, with formation of a group of empty packaging modules in this case for collapsed legs 38 which overlap and require higher shoes 44 to be able to house the collapsed legs on top of each other. The whole group can now be lifted and transported by one forklift truck without requiring a transport pallet for support. By collapsing the legs, volume is saved in the transport of the empty modules to a location for reuse.

Figure 13:
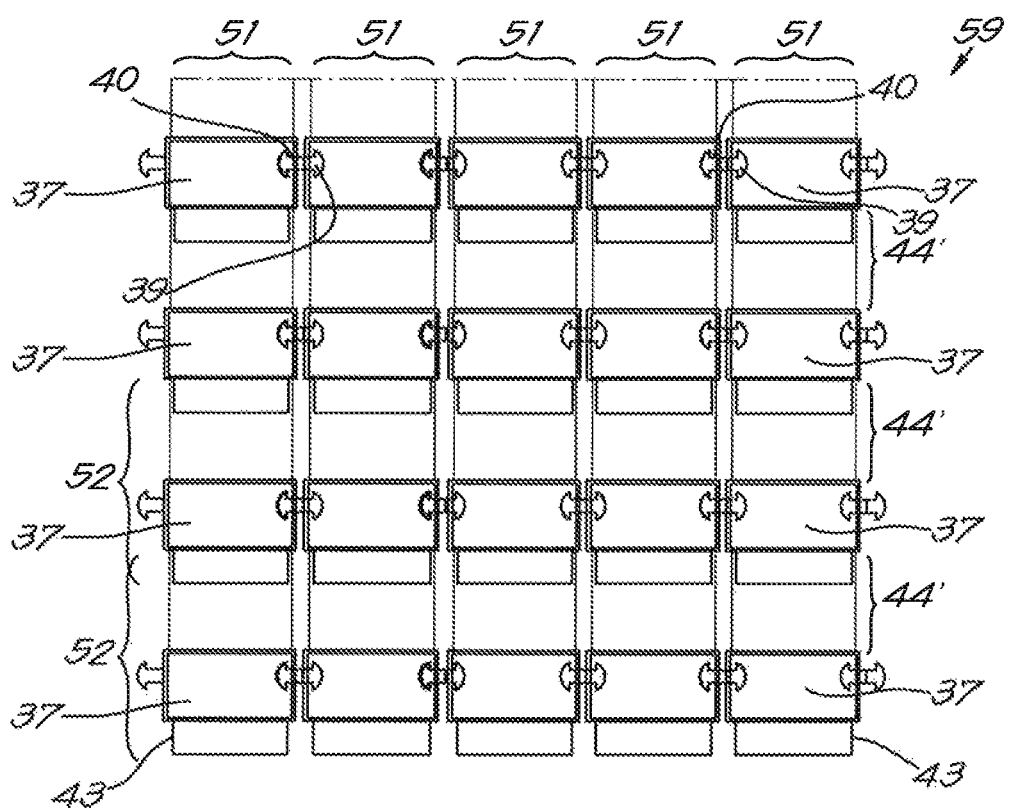

FIG. 13 also shows a front view of a group 59 of five stacks 51 of empty and collapsed modules 52 which are slid against each other, but now have shorter collapsed legs 53 that do not overlap and allow lower shoes 44' to house the two collapsed legs next to each other. Said group thus saves even more space in the return transport of the empty modules for reuse.

Figure 14:
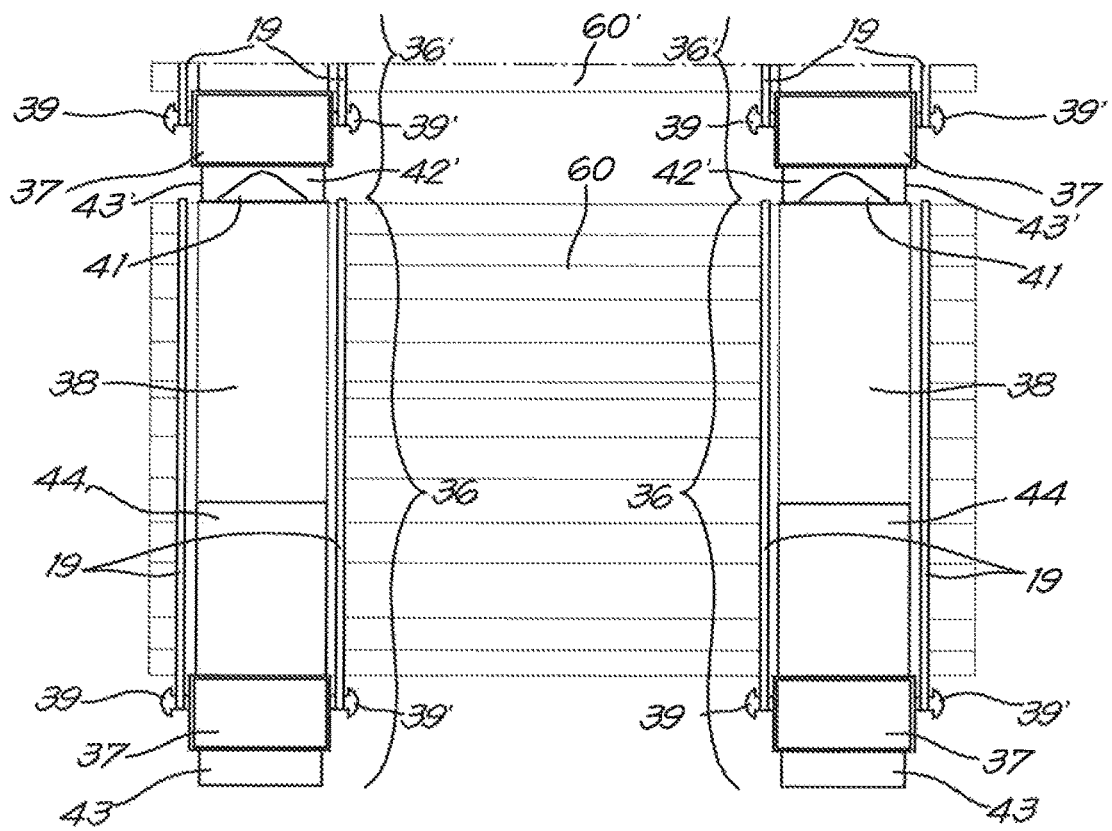
FIGS. 14 and 15 show a front view of a stack of two pairs of collapsible and load-filled packaging modules with long raised legs and with shorter raised legs.

FIG. 14 shows a front view of two pairs of packaging modules 36, 36' with raised legs 38 whereby between the raised legs 38 and the horizontal bottom profile 37 of each pair a load 60 is held, and whereby the second pair 36' is stacked with its load 60' on top of the first pair 36 with its load 60. The top modules 36' are kept in place by the pointed studs 41, which fit in cavities 42' provided to this end on the underside of the two feet 43' at the ends of the horizontal bottom profile 37' of a suprajacent packaging module 36'. The load 60 is held in place by straps 19 which are wound around the load 60 and the protrusions 39, 39' of the horizontal bottom profiles 37, 37.

Figure 15:
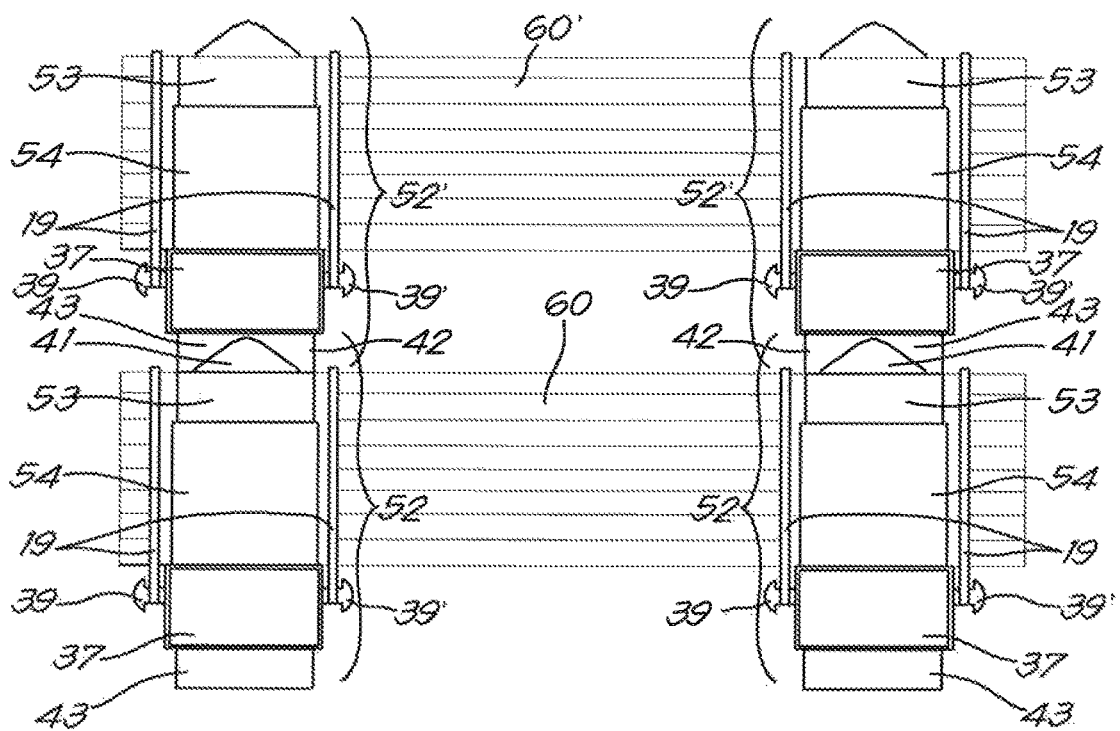

FIG. 15 also shows a front view of two pairs of packaging modules 52, 52' with raised legs 53 whereby between the now shorter raised legs 53 and the horizontal bottom profile 37, 37' of each pair of modules 52, 52', a load 60, 60' is held, and whereby the second pair of modules 52' is stacked with its load 60' on top of the first pair of modules 52 with its load 60. The top modules are held in place by the pointed studs 41 provided on the upperside of the two raised legs 38, which fit in cavities 42' provided to this end on the underside of the two feet 43' at the ends of the horizontal bottom profile 37' of a suprajacent packaging module 52'. The lower shoes 54, 54' of said packaging modules 52, 52' and the shorter raised legs 53, 53' make said packaging modules suitable for lower loads.

The operation of the packaging module 1 is very simple and as follows.

Each module has the same standard length and one of the available standard heights and can be manually handled and carried by a person because the weight is restricted (<30 kg).

For packaging bundles of long objects, for example tubes, the bundles are packaged by placing each one, symmetrically or not, on a number of packaging modules 2, which are each placed at a same centre distance (C) from each other by means of a forklift truck or other lifting device or simply manually. Even better is placing the packaging modules using a template or jig to place the modules at the correct distance from each other.

The bundles are fastened on each side of each packaging module by means of straps made from a light but strong material such as polyester, whereby the straps 18-21 or lashing straps are also guided around the mushroom-shaped or similar protrusions 11, 11', 6, 6' to securely connect the bundle 22 with each stackable module 2, 2' on which the bundle is lying.

The intention is to use at least one pair of modules 2, 2' or a multiple thereof, depending on the length of the load to be supported. There is no limit on the number of pairs of packaging modules that is applied to be able to cover the length of the load.

The weight of the top loads does not rest on the bottom loads, but on the underlying packaging modules, such that damage to the bottom loads is prevented. Said stacking method can be used for stacking goods in warehouses, but also in vessels or in lorries for example.

The standard length (for example 1.20 m) of the packaging modules allows two such modules to be placed next to each other in the loading space of a lorry and stacked safely on the loading floor to utilise the useful loading volume of a lorry or container to maximum effect. The number of stacked bundles then depends on the chosen module height and the weight restrictions if any.

After the load has been delivered and the load has been unloaded, the used empty packaging modules can be recovered and recycled, for example, through the same logistics channel which took care of the delivery or by a pooling company contracted to this end. For this it suffices to place the four empty packaging modules next to each other with the lateral protrusions in the lateral cavities provided to this end in the adjoining packaging module and this up to 2, 3, 4 or more layers high.

A forklift truck can now lift the full length of the outer packaging modules with its forks, such that the intermediate modules are also lifted because the protrusions interlock with an edge into the adjacent modules. This method makes the use of transport pallets unnecessary to transport and recycle the used packaging modules.

The packaging modules are made from a 100% recyclable synthetic material or other recyclable material and can be recovered after their lifetime. Preferably the packaging modules are made from remeltable aluminium. If they are made from a synthetic material they can be reused in the same or another application by grinding them into smaller granules.

The straps for fastening can also be made in a recyclable synthetic material such as polyester or another recyclable stainless material. The use of the packaging modules prevents the creation of residual waste from wood, for example, which benefits the fire safety of the packaging, or from steel, which can be subject to rust.

The standardisation of the dimensions of the packaging modules also allows the movements of the modules to be automated more than is the case now, not only for shipping loads, but also for recovering the used empty packaging modules for reuse and particularly for the packaging process itself.

In an alternative embodiment the two upright legs are hingedly or disassemblably fastened to the horizontal bottom profile, whereby the upright legs can be collapsed or disassembled when the packaging modules are empty, such that the empty modules are much more compact to transport them empty to a next load to be loaded.

If the two upright legs are hingedly fastened to the horizontal bottom profile, the two upright legs 4, 5 of the collapsible packaging module are preferably fastened to the horizontal bottom profile 3 by means of two terminal shoes at the ends of the horizontal bottom profile, whereby each leg can be manually raised or collapsed in a vertical or horizontal position by rotating the leg and locking it in the vertical or the horizontal position by sliding the guide pins fixed to the upright leg in slots provided to this end in the shoe to which the leg is fastened.

In this alternative embodiment, the upright legs are collapsed after the load is removed, by manually rotating each collapsible leg from a vertical to a horizontal position, after which the collapsed packaging modules can be stacked on each other, whereby the horizontal bottom profile is provided at the bottom with a foot at both ends, said feet being fittingly slid in the space provided to this end in the shoes of the underlying collapsed module.

The vertical stacks of empty packaging modules formed in this way can be slid horizontally against adjoining stacks to form a group of five stacks, whereby each stack interlocks with the adjoining stack by means of the lateral protrusions in the bottom profiles which interlock with the lateral cavities provided to this end in the bottom profiles of the adjoining stack.

Such group of five stacks can be lifted by one forklift truck, and takes up a compact volume for the return transport of the empty packaging modules to a new destination for reuse.

The packaging modules that may or may not be collapsible or disassemblable can be wholly or partly made from metal or metal alloys.

The present invention also relates to a method for applying packaging modules with two upright legs hingedly fastened to the horizontal bottom profile whereby the two upright legs of the module are fastened to the horizontal bottom profile by means of two terminal shoes at the ends of the horizontal bottom profile, said method comprising at least the following steps:

choosing the length of the upright legs as a function of the load to be borne, said choice being able to be made in advance based on tables or a spreadsheet, whereby the lighter the load, the longer the chosen upright legs can be;

placing several bundles of long objects or other loads on the chosen packaging modules according to the invention with a leg length suitable for the load to be loaded, whereby the load to be loaded may or may not be symmetrically placed on at least two packaging modules;

fastening the load on each side of each packaging module by means of straps, whereby the straps are also guided around the protrusions on each horizontal profile of the packaging modules to securely connect the load with every stackable module on which the load is lying;

stacking overlying sets of packaging modules on an underlying set of modules by positioning the overlying sets with their feet under their horizontal bottom profiles on the pointed studs on the upperside of the upright legs of the bottom set of modules, such that said higher sets of packaging modules are also held in the desired location during storage or transport of the loaded packaging modules;

unloading the loaded load (60, 60') after storage or transport of the loaded packaging modules (36, 48, 52) by taking off the loaded packaging modules with a forklift truck, reach truck or side carrier, or lifting them using a lifting device or crane whereby the square lifting holes (50) in the upright legs (38, 49, 53) of the packaging modules (36, 48, 52) can be used to fasten the loaded packaging modules to the lifting device and move them;

removing the straps (19), and taking the load off the packaging modules (36, 48, 52);

recovering the used packaging modules for reuse by collapsing the upright legs of the packaging modules, and stacking the modules of equal shoe height on each other in one vertical stack per type of packaging module;

grouping five vertical stacks of the same type of packaging module by sliding said five stacks against each other into one group of stacks, whereby each vertical stack interlocks with the adjoining vertical stack by the interlocking operation of the protrusions on each horizontal profile of one vertical stack with the hollow recesses of an adjacent horizontal profile of an adjacent cooperating vertical stack.

moving a group of interlocking vertical stacks by means of a forklift truck or another lifting device, to a suitable means of transport;

transporting the recovered packaging modules to a location where they can be reused.

The present invention is by no means limited to the embodiments described as an example and shown in the figures, but a stackable packaging module according to the invention can be realised in all kinds of forms and dimensions without departing from the scope of the invention, as is described in the following claims.

The invention claimed is:

1. Stackable packaging modules for packaging oblong objects, the packaging modules having a U-shaped profile, formed by a horizontal bottom profile and two upright legs, the horizontal bottom profile having a pair of opposing sides, wherein the U-shaped profile is made from a reusable and recyclable material, the horizontal bottom profile has a standard length and the two upright legs can have several heights, each of the pair of opposing sides of the horizontal bottom profile are provided with at least two protrusions and at least two hollow recesses in which the at least two protrusions and at least two recesses of a horizontal bottom profile of an adjoining module fit and an underside of the horizontal bottom profile is provided over the whole length with a slit-shaped recess in which a fork of a forklift truck, reach truck or side loader fits and in that the upright legs are provided with convex studs on an upper surface of the upright legs, the convex studs fit in concave cavities provided on the underside of the horizontal bottom profile of an overlying packaging module.

2. The stackable packaging modules according to claim 1, wherein the protrusions are mushroom-shaped protrusions or protrusions provided with an edge with which the protrusions can interlock with an adjoining module.

3. The stackable packaging modules according to claim 2, wherein the protrusions of the horizontal bottom profile of filled packaging modules that are positioned spaced apart at a fixed center distance from each other protrude freely and can be used to fasten bundles of packaged objects to the load-bearing packaging module by fastening the bundles with straps made from synthetic material which are wound around the mushroom-shaped or other protrusions with the purpose of retaining the relative position of the packaging module and the borne load bundle during the handling, transporting or stacking of the loaded packaging modules.

4. The stackable packaging modules according to claim 3, wherein the fixed center distance between vertical virtual middle sections of the load-bearing packaging modules is equal to 80 cm or a multiple thereof, with the purpose of being able to lift and move two or more packaging modules with their load by the forks of the forklift truck, the reach truck or the side loader.

5. The stackable packaging modules according to claim 1, wherein the reusable and recyclable material is a reusable and recyclable synthetic material.

6. The stackable packaging modules according to claim 1, wherein the standard length of the horizontal bottom profile is 1.20 m.

7. The stackable packaging modules according to claim 1, wherein the height of both upright legs is 48 cm or 80 cm, measured from the underside of the horizontal bottom profile to the upper surface of the upright legs.

8. The stackable packaging modules according to claim 1, wherein the protrusions of the horizontal bottom profile allow several empty adjoining packaging modules to interlock such that they can be handled, transported or stacked without the help of a load-bearing pallet.

9. The stackable packaging modules according to claim 1, wherein the convex studs provided on the upperside of the upright legs and which fit in concave cavities provided to this end on the underside of an overlying module automatically correct small position differences when stacking the modules and further prevent that the stacked packaging modules shift relative to each other during their handling, transport or storage.

10. The stackable packaging modules according to claim 1, wherein a series of four empty packaging modules are slid against each other with the protrusions in the hollow recess of the adjoining module and form an interlocked series of four modules or module towers, wherein the series of four empty packaging modules or module towers can be lifted by two forks of a forklift truck, whereby the modules not supported by the fork continue to be interlocked by the interlocking operation of the protrusions and the at least four empty modules or module towers can be lifted self-supportingly without the support of a load-bearing pallet.

11. The stackable packaging modules according to claim 1, wherein the two upright legs are fastened to the horizontal bottom profile, whereby the upright legs can be collapsed or disassembled when the packaging modules are empty, such that the empty modules are more compact to transport them empty to a next load to be loaded, and whereby the upright legs are between 1.50 m and 0.30 m long.

12. The stackable packaging modules according to claim 11, wherein the two upright legs are hingedly fastened to the horizontal bottom profile whereby the two upright legs of the module are fastened to the horizontal bottom profile by two terminal shoes at the ends of the horizontal bottom profile, whereby each leg can be manually raised or collapsed in a vertical or horizontal position by rotating the leg and locking it in the vertical or the horizontal position by sliding guide pins fixed to the upright leg in designated slots of the shoe to which the leg is hingedly fastened.

13. The stackable packaging modules according to claim 12, wherein the packaging modules are made of a metal alloy.

14. A method for using packaging modules described in claim 12, the method comprises at least the following steps:
choosing the length of the upright legs as a function of the load to be borne, said choice being able to be made in advance based on tables or a spreadsheet, whereby the lighter the load, the longer the chosen upright legs can be;
placing several bundles of long objects or other loads on the chosen packaging modules with a leg length suitable for the load to be loaded, whereby the load to be loaded is placed on at least two packaging modules;
fastening the packaging module load on each side of each packaging module by straps, whereby the straps are also guided around the protrusions on each horizontal profile of the packaging modules to securely connect the load with every stackable module on which the load is lying;
stacking overlying sets of packaging modules on an underlying set of modules by positioning the overlying sets with their feet under their horizontal bottom profiles on the pointed studs on the upperside of the upright legs of the bottom set of modules, such that said higher sets of packaging modules are also held in the desired location during storage or transport of the loaded packaging modules;
unloading the loaded load after storage or transport of the loaded packaging modules by taking off the loaded packaging modules with the forklift truck, the reach truck or the side loader, or lifting them using lifting device or crane whereby square lifting holes in the upright legs of the packaging modules can be used to fasten the loaded packaging modules to the lifting device and move them;
removing the straps, and taking the load off the packaging modules;
recovering the used packaging modules for reuse by collapsing the upright legs of the packaging modules, and stacking modules of equal shoe height on each other in one vertical stack per type of packaging module;
grouping five vertical stacks of the same type of packaging module by sliding said five stacks against each other into one group of stacks, whereby each vertical stack interlocks with the adjoining vertical stack by the interlocking operation of the protrusions with each horizontal profile of one vertical stack with the hollow recesses of an adjacent horizontal profile of an adjacent cooperating vertical stack;
moving a group of interlocking vertical stacks by the forklift truck or the lifting device, to a suitable transport; and
transporting the recovered packaging modules to a location where they can be reused.

15. The stackable packaging modules according to claim 11, wherein the packaging modules are made of a metal alloy.

16. A method for using packaging modules in claim 1, the method comprises at least the following steps:
placing several bundles of long objects on packaging modules by placing each bundle, symmetrically or not, on a number of packaging modules which are each placed at the same center distance from each other;
fastening the bundles to each side of each packaging module by straps, whereby the straps are also guided around the protrusions on each horizontal profile of the packaging modules to securely connect the bundle with every stackable module on which the bundle is lying;
stacking overlying series of packaging modules on the underlying set of modules, by positioning them with their recesses at the bottom in their horizontal bottom profiles on the convex studs on the upperside of the upright legs of the bottom set of modules, such that this second series of packaging modules is also at the same center distance of each other, in case more than one set of modules is needed to package the loads;
placing and fastening the overlying bundles as specified in the first two steps, whereby the number of modules can decrease per layer to bear shorter loads;
unloading the loaded load after storage or transport of the loaded packaging modules by taking off the desired modules with the forklift truck, the reach truck or the side loader and removing the straps;
recovering the used packaging modules for reuse by lifting the packaging modules in groups of four adjoining empty packaging modules by the forklift truck or other lifting device, whereby the outer two modules are lifted and the intermediate modules are also lifted, in that the protrusions of the horizontal profiles of the packaging modules interlock with the adjoining profiles of the empty packaging modules and also lift them without requiring a load-bearing pallet for support; and
transporting the recovered packaging modules to a location where they are reused.

17. The stackable packaging modules according to claim 1, wherein the reusable and recyclable material is a reusable and recyclable metal.

18. The stackable packaging modules according to claim 17, wherein the reusable and recyclable metal is a remeltable aluminum.

\* \* \* \* \*